(12) United States Patent
Haykinson et al.

(10) Patent No.: US 9,226,023 B2
(45) Date of Patent: *Dec. 29, 2015

(54) DEVICE ACTIVATION FOR A SERVICE USING AN OUTPUTTED REPRESENTATION

(71) Applicant: Hulu, LLC, Santa Monica, CA (US)

(72) Inventors: Ilya Haykinson, Santa Monica, CA (US); Daniel Honig Bear, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,725

(22) Filed: May 6, 2015

(65) Prior Publication Data

US 2015/0237394 A1    Aug. 20, 2015

Related U.S. Application Data

(63) Continuation of application No. 13/901,309, filed on May 23, 2013, now Pat. No. 9,055,313.

(60) Provisional application No. 61/740,236, filed on Dec. 20, 2012.

(51) Int. Cl.
| | | |
|---|---|---|
| G06F 3/00 | (2006.01) | |
| G06F 13/00 | (2006.01) | |
| H04N 5/445 | (2011.01) | |
| H04N 21/441 | (2011.01) | |
| H04N 21/41 | (2011.01) | |
| H04N 21/426 | (2011.01) | |
| H04N 21/436 | (2011.01) | |

(52) U.S. Cl.
CPC ......... *H04N 21/441* (2013.01); *H04N 21/4126* (2013.01); *H04N 21/42684* (2013.01); *H04N 21/43615* (2013.01)

(58) Field of Classification Search
CPC .............. H04N 7/163; H04N 21/4532; H04N 21/4751; H04N 21/4753; H04N 5/44543
USPC ......................................... 725/19, 39, 83, 93
See application file for complete search history.

(56) References Cited

U.S. PATENT DOCUMENTS

| | | | |
|---|---|---|---|
| 9,055,313 B2 * | 6/2015 | Haykinson et al. | |
| 2007/0016936 A1 | 1/2007 | Okada et al. | |
| 2010/0289537 A1 | 11/2010 | Bellur et al. | |
| 2014/0181877 A1 | 6/2014 | Ilya Haykinson | |

* cited by examiner

*Primary Examiner* — Hunter B Lonsberry
(74) *Attorney, Agent, or Firm* — Fountainhead Law Group PC

(57) ABSTRACT

In one embodiment, a method activates a first device for using a service. A second device receives, from a third device, a user identifier for a user and a unique identifier for the first device. The user identifier originates from the third device and the unique identifier originates from the first device in a representation outputted by the first device. The second device determines a user account for the service, the user account being associated with the user identifier for the user. The second device associates the unique identifier for the first device with the user account. Then, the second device communicates with the first device to activate the first device to use the service in response to receiving the user identifier and the unique identifier. The second device allows access to the service from an application running on the first device.

20 Claims, 6 Drawing Sheets

DEVICE ACTIVATION FOR A SERVICE USING AN OUTPUTTED REPRESENTATION

CROSS REFERENCE TO RELATED APPLICATIONS

The present disclosure is a continuation of U.S. application Ser. No. 13/901,309, entitled "DEVICE ACTIVATION USING ENCODED REPRESENTATION", filed May 23, 2013, which claims priority to U.S. Provisional App. No. 61/740,236, entitled "DEVICE ACTIVATION USING ENCODED REPRESENTATION", filed Dec. 20, 2012, the contents of both are incorporated herein by reference in its entirety.

BACKGROUND

A media program delivery service may offer different media programs for delivery to users. A user may use a variety of devices to receive and view the media programs. For example, "living room" may be Internet-connected devices that may be located in a user's living room and are relatively stationary. Although living room devices are discussed, it is recognized that the devices may be located in other locations. Examples of living room devices include Internet-connected televisions, set top boxes, gaming consoles, etc.

When a user wants to view media programs on a living room device, the user needs to first activate the living room device with the media program delivery service. For example, a user may download an application associated with the media program delivery service onto the living room device. Then, to associate the living room device with the user's account for the media program delivery service, a unique ID of the living room device needs to be sent to the media program delivery service.

In one method of activation, a user uses a remote control to input the user's username and password into the application on a display of the living room device. The application would then activate the living room device by sending the living room device's unique ID to the media program service. Once this occurs, the media program delivery service activates the living room device and associates the living room device with the user's account. Once activated, the user can use the application to have media programs delivered to the living room device. However, having the user log in using the remote control may be time consuming and difficult because some remote controls do not provide convenient ways of input. For example, a gaming console's controller is not meant to input text and does not have a full alpha-numeric keyboard. This requires that a user to use an arrow pad to enter in one letter at a time. Additionally, a television remote control often does not have a full alpha-numeric keyboard either.

In another method of activation, the living room device may display an activation code on a display device. The user must then go to another device, such as a laptop computer or mobile device, and log on to a website associated with the media program delivery service. After logging on to the user's account on the website, the user enters in the activation code being displayed on the living room device. Once this occurs, the media program delivery service activates the living room device and associates the living room device with the user's account. The activation code identifies a unique ID for the living room device. In this case, the media program delivery service can identify the living room device and send credentials for the user to the living room device such that the user is automatically logged in to the device. Afterwards, the user may automatically use the living room device to have media programs delivered to it without logging on again.

SUMMARY

In one embodiment, a method activates a first device for using a service. A second device receives, from a third device, a user identifier for a user and a unique identifier for the first device. The user identifier originates from the third device and the unique identifier originates from the first device in a representation outputted by the first device. The third device captured the outputted representation in a same physical location as the first device. The second device determines a user account for the service, the user account being associated with the user identifier for the user. The second device associates the unique identifier for the first device with the user account, wherein the association allows the user to use the service with the first device. Then, the second device communicates with the first device to activate the first device to use the service in response to receiving the user identifier and the unique identifier. The second device allows access to the service from an application running on the first device in response to associating the unique identifier with the user account and activating the first device.

In one embodiment, a non-transitory computer-readable storage medium contains instructions for activating a first device for using a service, wherein the instructions, when executed, control a second device to be configured for: receiving, by the second device from a third device, a user identifier for a user and a unique identifier for the first device, the user identifier originating from the third device and the unique identifier originating from the first device in a representation outputted by the first device, wherein the third device captured the outputted representation in a same physical location as the first device; determining, by the second device, a user account for the service, the user account being associated with the user identifier for the user; associating, by the second device, the unique identifier for the first device with the user account, wherein the association allows the user to use the service with the first device; communicating, by the second device, with the first device to activate the first device to use the service in response to receiving the user identifier and the unique identifier; and allowing, by the second device, access to the service from an application running on the first device in response to associating the unique identifier with the user account and activating the first device.

In one embodiment, a method for activating a first device for delivering media to the first device includes: upon being provided on a first device, determining, by an application, that activation of the first device via a second device is necessary for configuring a service for a user to use on the first device; determining a unique ID for the first device from the application, the unique ID originating from the first device; outputting a representation of the unique ID via the first device, wherein: the representation is configured to be captured by a third device in a same physical location and the third device can recognize the unique ID, the second device is configured to determine a user identifier for the user to the second device to allow the second device to activate the first device for the service, the user identifier originating from the second device, and the third device automatically receives the unique ID and the user identifier from the second device and activates the first device to use the service in response to receiving the user identifier and the unique identifier.

The following detailed description and accompanying drawings provide a better understanding of the nature and advantages of particular embodiments.

DETAILED DESCRIPTION

Described herein are techniques for a device activation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
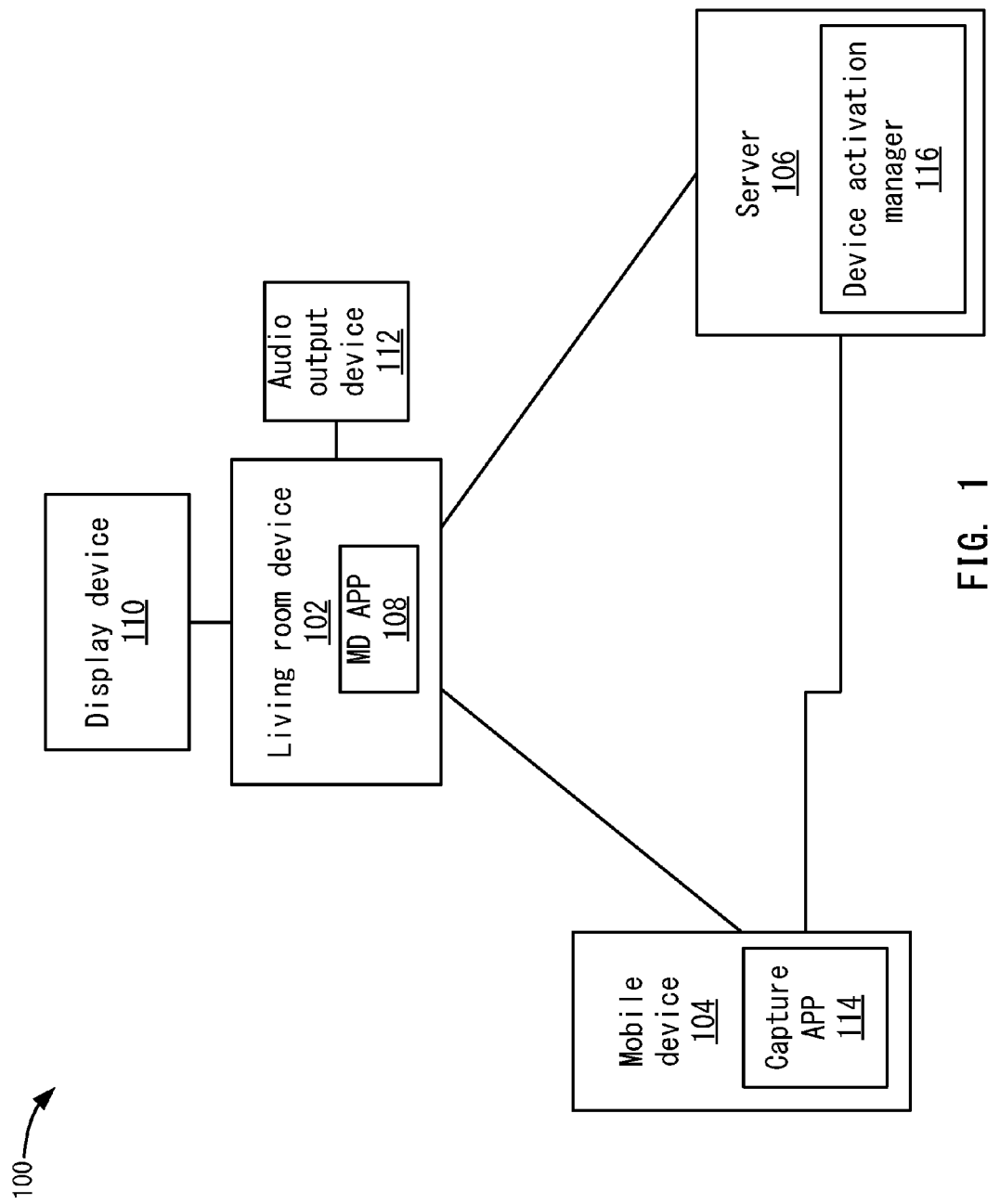
FIG. 1 depicts a simplified system for device activation according to one embodiment.

FIG. 1 depicts a simplified system 100 for device activation according to one embodiment. System 100 includes a living room device 102, a mobile device 104, and a server 106. These devices may communicate through a local area network (LAN) and/or wide area network (WAN) that may be wireless or wired.

Living room device 102 may be associated with a display device 110 or audio output device 112. Display device 110 and audio output device 112 may be integrated with living room device 102 or may be separate from living room device 102. For example, living room device 102 may be a set top box or other computing device, such as a gaming console or media center, and may be connected to a television or monitor. Additionally, living room device 102 may have integrated speakers or be connected to other speakers.

Living room device 102 is also Internet-connected where living room device 102 can connect to a media program delivery service. The media program delivery service delivers media programs to living room device 102 through server 106. For example, a user may use media delivery application 108 to browse media programs, such as television shows or movies. Media delivery application 108 may be any instance that allows a user to access the media delivery service. For example, media delivery application 108 may be an application running on living room device 102. In other examples, media delivery application 108 may be a web browser that opens a webpage that allows the user to access the media delivery service. Also, media delivery application 108 may be a link to a web page that, when selected, opens the web page and allows the user to access the media delivery service. The user can select one of the media programs on media delivery application 108 and have the media program delivered, such as through a streaming protocol, to living room device 102. Although a single server is shown, it will be understood that multiple servers may be used to deliver media programs. Further, servers that deliver media program may not necessarily be used in device activation.

Before delivery of the media programs can begin, a user needs to activate living room device 102 through server 106. The activation requires a third entity different from mobile device 104 and living room device 102. This is because the activation is for activating living room device 102 for the media program delivery service. Mobile device 104 is not being paired with living room device 102, but is rather being used to activate living room device 102. Mobile device 104 is not being activated in this scenario. During activation, living room device 102 is associated with a user's account at the media program delivery service. Additionally, as discussed above, user credentials may be sent to living room device 102 to have the user automatically logged in when using a media delivery application (MD APP) 108. Once device activation is performed, then the user can have media programs delivered to living room device 102 using media delivery application 108. Although activation is described with respect to a media program delivery service, particular embodiments may be used in any situation where one device wants to share a user session with another device in the same physical location. In this case, a user may activate a device using mobile device 104 through server 106.

To activate the device, a unique ID of living room device 102 needs to be associated with the user's account at the media program delivery service. A unique ID may uniquely identify living room device 102 from other living room devices 102 within a group. For example, each television manufactured by a company may have a unique ID associated with it. Additionally, every television manufactured may be uniquely identified.

Particular embodiments allow a user to automatically activate living room device 102 without having to input the unique ID into an application when living room device 102 needs to be activated through server 106. Also, a user does not need to use a remote control to log into media delivery application 108 to have living room device 102 activated. As will be discussed in more detail below, media delivery application 108 may encode the unique ID of living room device 102 into an encoded representation. For example, the encoded representation may be a visual representation, such as a standard one-dimensional barcode, a two-dimensional barcode (e.g., a quick response (QR) code), or an audio representation, such as data within an audio signal (e.g., a sequence of audio tones, interspersed audio, or encoded audio in the audio signal). Living room device 102 outputs the encoded representation on an output device, such as on display device 110 or through audio output device 112.

A user may use mobile device 104 to capture the encoded representation, such as a capture application (Capture APP) 114 is opened and used to capture the encoded representation. In one example, capture application 114 may control a scanner (e.g., a camera) that can scan the barcode or may be an audio recognition application that can recognize the audio representation received through a microphone. Once capture application 114 captures the encoded representation, capture application 114 can determine the unique ID of the living room device 102. Different methods for determining the unique ID may be appreciated and will be described in more detail below.

Once determining the unique ID, capture application 114 sends the unique ID along with a user identifier for the user's account to a device activation manager 116 in server 106. The user identifier may be information associated with the user, such as a user session token, which is an encrypted record of the user's authenticated session on capture application 114. In other examples, a user's log in and password (e.g., credentials) for the media program delivery service are sent. Device activation manager 116 uses the user identifier to determine the user's account for the media program delivery service and then activates living room device 102 using the unique ID. In the activation process, device activation manager 116 may associate the unique ID of living room device 102 with the user's account for the media program delivery service. In this case, the media program delivery service requires that living room device 102 be activated for a user to receive media programs on that device. Also, device activation manager 116 may send credentials for the user to living room device 102. Living room device 102 receives the credentials using various methods. For example, living room device 102 "polls" (requests repeatedly at a specified interval) device activation manager 116 for the credentials. Also living room device 102 may open a socket and wait for the credentials from device activation manager 116. Once capture application 114 notifies device activation manager 116, then server 106 will start returning a successful response to living room device 102 including the authenticated details of the user account. Living room device 102 stores the credentials and media delivery application 108 uses the credentials to automatically log the user in to the media program delivery service when the user opens application 108. Thus, the user does not need to log in every time application 108 is used on living room device 102. Additionally, after activation, the user can have media programs delivered to living room device 102. Accordingly, a user has activated living room device 102 automatically without having to input a unique ID (or any representation of the unique ID) into any kind of application. This provides an efficient way for a user to activate living room device 102 with the media program delivery service.

Figure 2:
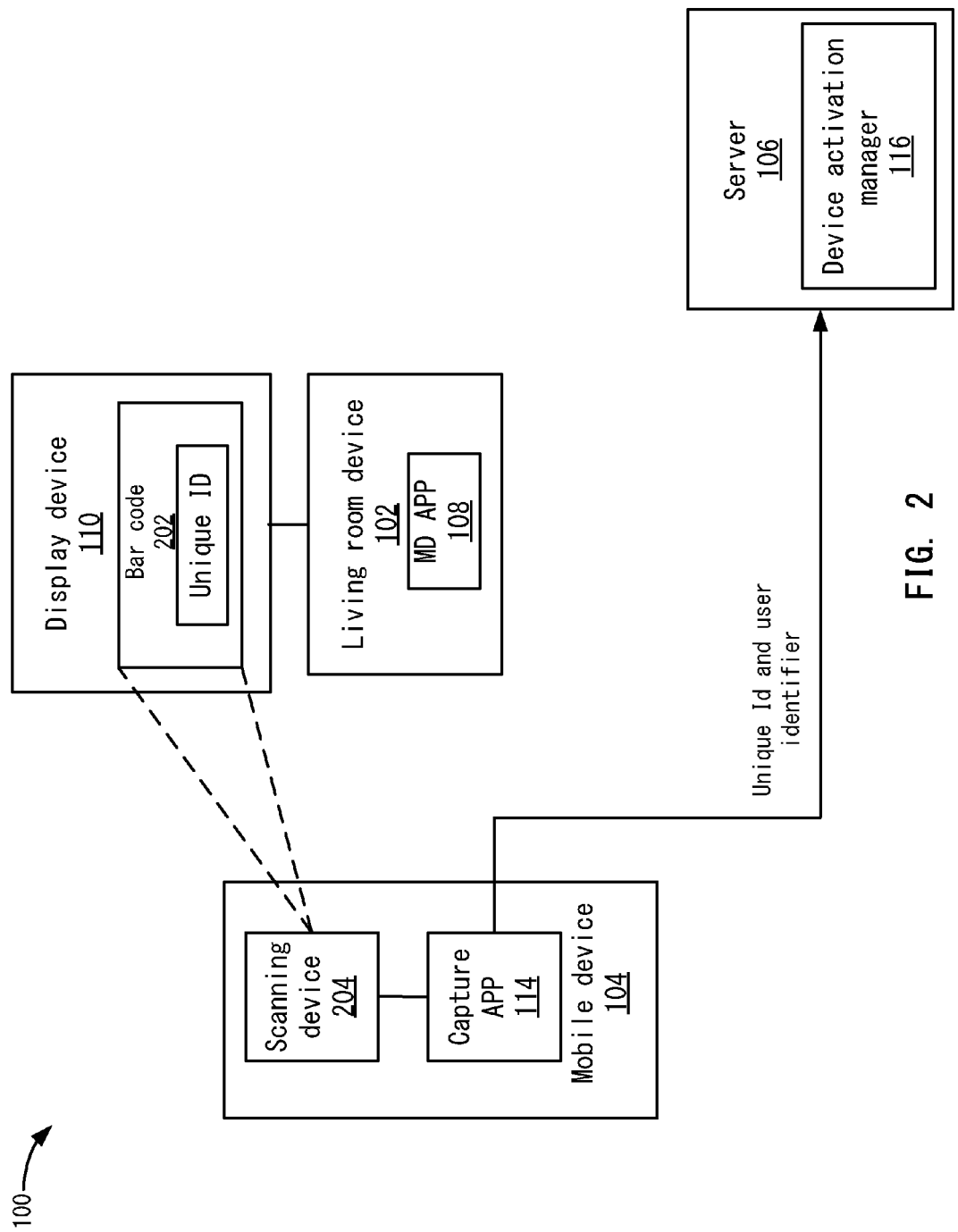
FIG. 2 shows an example where the encoded representation is a visual representation according to one embodiment.

As discussed above, the encoded representation may take the form of a visual representation or an audio representation. FIG. 2 shows an example where the encoded representation is a visual representation according to one embodiment. In this case, display device 110 outputs a barcode 202. Although barcode 202 is discussed, other visual representations, such as pictures and codes, may also be appreciated. Barcode 202 encodes the unique ID of living room device 102. For example, application 108 may determine the unique ID of living room device 102 and encode the unique ID in generating barcode 202.

Mobile device 104 includes a scanning device 204, such as a camera or infrared (IR) scanner. Capture application 114 is used to control scanning device 204 to capture barcode 202. For example, a user may focus scanning device 204 on barcode 202 and scanning device 204 captures an image of barcode 202. After capturing barcode 202, particular embodiments may determine the unique ID. Capture application 114 sends the unique ID and the user identifier to server 106.

In one example, a user may be using an application that is associated with the media program delivery service. For example, the media program delivery service may have created a scanning application that the user is using. In another example, the user may not be using an application that is associated with the media program delivery service. For example, the user may only be using a standard barcode scanning application.

Figure 3:
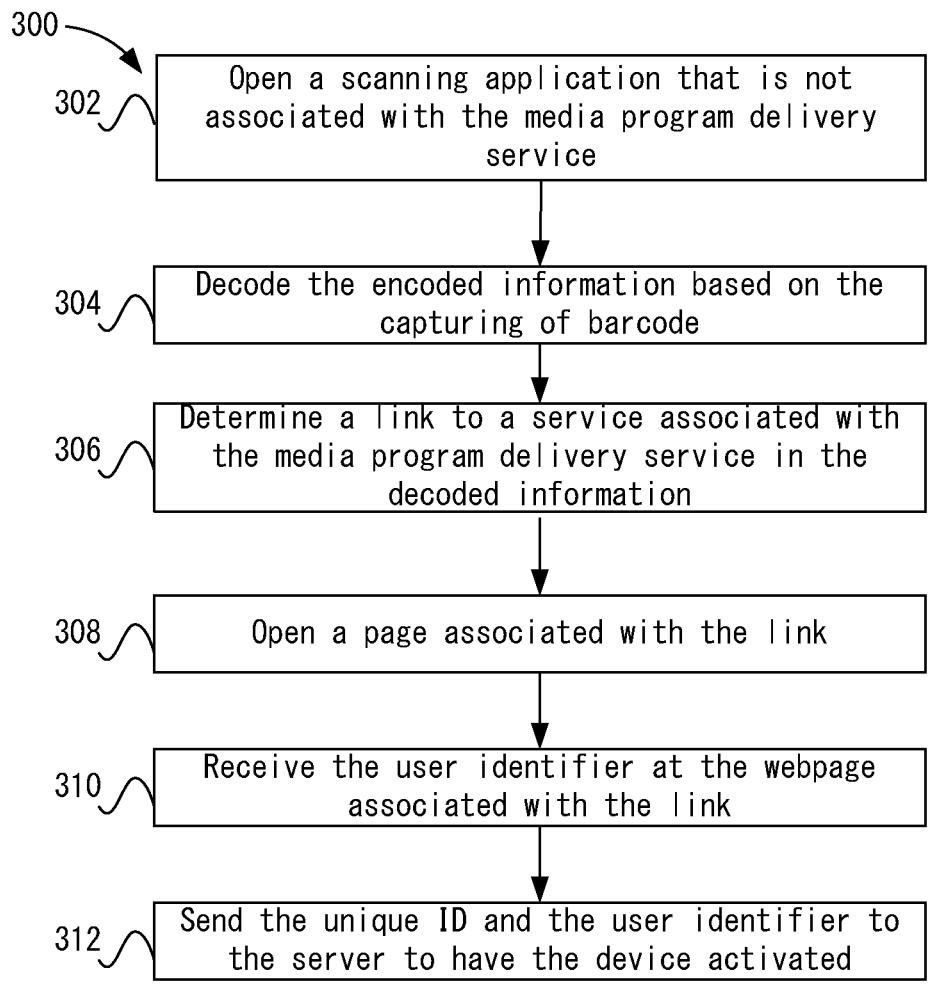
FIG. 3 depicts a simplified flowchart of a method for using a capture application that is not associated with the media program delivery service according to one embodiment.

FIG. 3 depicts a simplified flowchart 300 of a method for using a capture application 114 that is not associated with the media program delivery service according to one embodiment. At 302, mobile device 104 opens a scanning application that is not associated with the media program delivery service. For example, the user may open a camera application that is configured for general scanning of barcodes 202.

At 304, the scanning application decodes the encoded information based on the capturing of barcode 202. The scanning application may decode the encoded information using known methods. At 306, the scanning application determines a link to a service associated with the media program delivery service in the decoded information. For example, barcode 202 may include a universal resource locator (URL) to a webpage associated with the media program delivery service. An example of the link may be: www.hulu.com/activate?activation_code=ABC123.

At 308, the scanning application opens a page associated with the link. For example, the URL is opened in a web browser to display a page associated with the link. The page that is opened is automatically configured to determine the unique ID from the link. For example, the link may have included the unique ID and is determined by the web page. In other embodiments, the web page may analyze the decoded information captured from barcode 202 to determine the unique ID.

Because the user is using a scanning application not associated with the media program delivery service, the user has not provided a user identifier for the user's account associated with the media program delivery service. Thus, at 310, the webpage associated with the link receives the user identifier. For example, the webpage may include entry boxes for a user to log on to the user's account at the media program delivery service using the user identifier and a password. Once the user logs on using the user identifier, at 312, the page sends the unique ID and the user identifier to server 106 to have the device activated.

Figure 4:
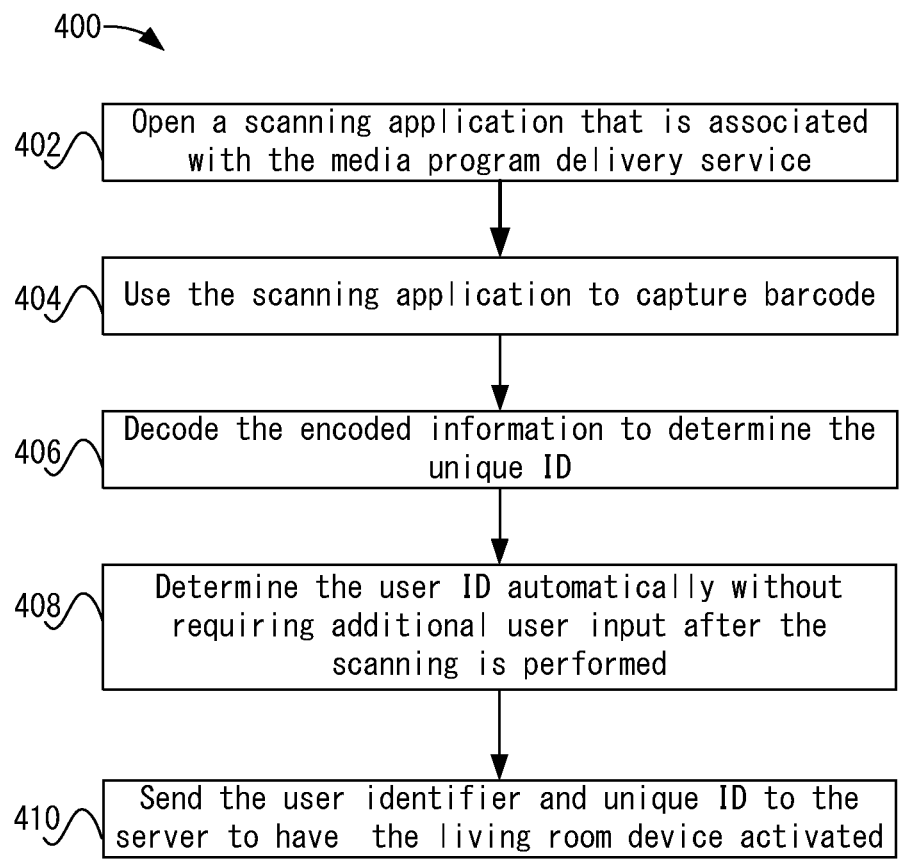
FIG. 4 depicts another method for activating a device when using a scanning application associated with the media program delivery service according to one embodiment.

FIG. 4 depicts another method for activating a device when using a scanning application associated with the media program delivery service according to one embodiment. At 402, mobile device 104 opens a scanning application that is associated with the media program delivery service. For example, the user may go to a webpage associated with the media program delivery service and log in. It should be noted that the user may be automatically logged in using pre-stored information, such as cookies. Also, this page includes a scanning feature, such as the user may select a feature that launches the scanning application when the user wants to scan barcode 202. Alternatively, instead of opening a web page, the user may open a pre-installed application associated with the media program delivery service and log in (or be logged in automatically). For example, the user may have downloaded an application that is run on a smartphone. This application also includes a scanning application.

At 404, the scanning application is used to capture barcode 202. For example, a user may activate the scanning application from the media program delivery service application and use it to capture barcode 202. At 406, the scanning application decodes the encoded information to determine the unique ID. Because the application is associated with the media program delivery service, this application knows how to decode the URL in barcode 202 to determine the unique ID. Additionally, because a user has already logged in to the user's account on the media program delivery service application, at 408, the scanning application can determine the user ID automatically without requiring additional user input after the scanning is performed. Thus, the user does not have to enter the user ID into the scanning application after scanning barcode 202 in most cases. At 410, the scanning application sends the user identifier and unique ID to server 106 to have living room device 102 activated.

Figure 5:
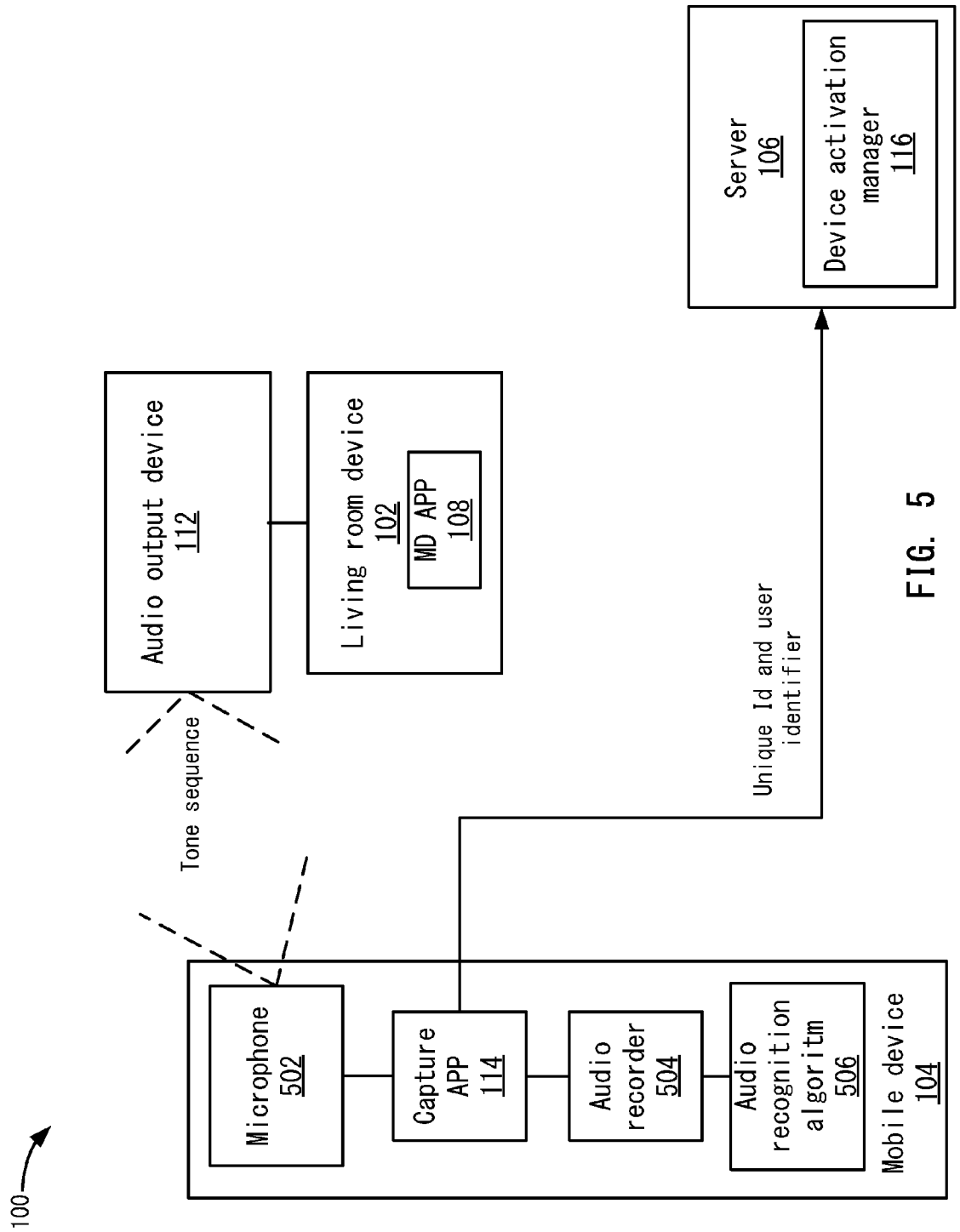
FIG. 5 depicts an example of system that is used to activate a living room device using an audio representation according to one embodiment.

As discussed above, particular embodiments may also activate living room device 102 via an audio representation. FIG. 5 depicts an example of system 100 that is used to activate living room device 102 using the audio representation according to one embodiment. Audio output device 112 of living room device 102 may output the audio representation that represents the unique ID of living room device 102. For example, application 108 uses the unique ID of living room device 102 to generate data that can be included within an audio signal, such as an audio tone sequence. The data within the audio signal may encode the unique ID in the audio signal. Then, audio output device 112 outputs the audio representation.

Mobile device 104 uses capture application 114 to activate a microphone 502 that is used to capture the audio representation. In one embodiment, capture application 114 is associated with the media program delivery service because the use of capturing the audio representation may not be a common application. However, a generic audio capture application may also be used.

After activation, microphone 502 listens for any the audio representation. An audio recorder 504 records the audio representation for a certain time period, such as for a few seconds or enough time to capture the tone sequence that has encoded the unique ID. Then, an audio recognition algorithm 506 may be run to convert the audio representation into information that can be used to extract the unique ID. For example, the data within in the audio signal, such as the audio tone sequence, is converted into digital information. Then, the unique ID is extracted from the digital information. Because the user is using an application associated with the media program delivery service, the user may already be logged in to the user's account. If not, the user may enter log in information. Capture application 114 then sends the unique ID and user ID to server 106 to have living room device 102 activated.

Figure 6:
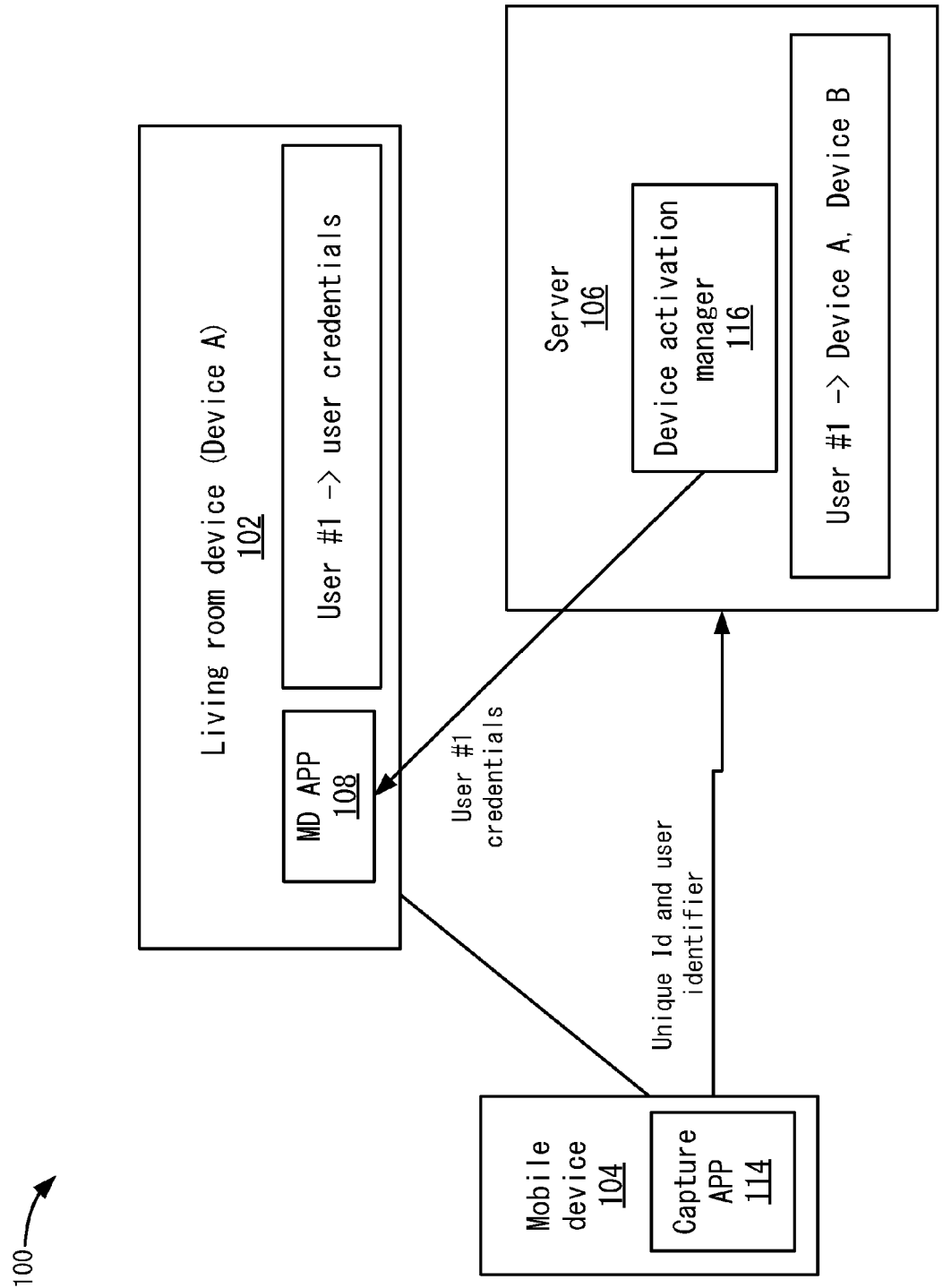
FIG. 6 shows an example of the device activation process according to one embodiment.

FIG. 6 shows an example of the device activation process according to one embodiment. Server 106 receives the unique ID and user identifier. Device activation manager 116 looks up the user's account using the user identifier. For example, device activation manager 116 determines the user account for "User #1". Device activation manager 116 then associates the unique ID with the user's account. As shown, devices A and B are associated with the user #1's account.

Device activation manager 116 then communicates user credentials to device A, which is being activated in this case. Media delivery application 108 receives the credentials and stores them. Now, when a user opens media delivery application 108, the user is automatically logged in to the media delivery service and can select media programs to stream to device A.

Accordingly, particular embodiments allow a user to activate a device without having to input the device's unique ID or any other character sequence representing the unique ID to have the device activated. This also alleviates the user from entering in any information using a remote control that may be inconvenient. This provides a convenient activation of media delivery application 108.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for activating a first device for using a service, the method comprising:
   receiving, by a second device from a third device, a user identifier for a user and a unique identifier for the first device, the user identifier originating from the third device and the unique identifier originating from the first device in a representation outputted by the first device, wherein the third device captured the outputted representation in a same physical location as the first device;
   determining, by the second device, a user account for the service, the user account being associated with the user identifier for the user;
   associating, by the second device, the unique identifier for the first device with the user account, wherein the association allows the user to use the service with the first device;
   communicating, by the second device, with the first device to activate the first device to use the service in response to receiving the user identifier and the unique identifier; and
   allowing, by the second device, access to the service from an application running on the first device in response to associating the unique identifier with the user account and activating the first device.

2. The method of claim 1, wherein the user identifier and the unique identifier are received via a page for the service that is opened on the second device.

3. The method of claim 1, wherein communicating with the first device to activate the first device comprises:
   communicating, by the second device, user credentials to the first device to activate the first device to use the service.

4. The method of claim 3, wherein the user credentials are used by the first device to automatically log in the user to the service when using the application.

5. The method of claim 1, wherein the user had previously logged into the third device using the user identifier before the capturing is performed.

6. The method of claim 1, further comprising:
   receiving a request for a media program from the application on the first device at the service; and
   providing the media program to the first device in response to the request.

7. The method of claim 1, wherein:
   the representation comprises an encoded representation including the unique identifier, and the third device captured the encoded representation and decoded the encoded representation to determine the unique identifier.

8. The method of claim 1, wherein the unique identifier uniquely identifies the first device among a group of devices.

9. The method of claim 1, wherein the unique identifier is uniquely identified by a company that manufactured the first device.

10. The method of claim 1, wherein the second device activates the first device without having a user type in the unique ID on the third device.

11. A non-transitory computer-readable storage medium containing instructions for activating a first device for using a service, wherein the instructions, when executed, control a second device to be configured for:

receiving, by the second device from a third device, a user identifier for a user and a unique identifier for the first device, the user identifier originating from the third device and the unique identifier originating from the first device in a representation outputted by the first device, wherein the third device captured the outputted representation in a same physical location as the first device;

determining, by the second device, a user account for the service, the user account being associated with the user identifier for the user;

associating, by the second device, the unique identifier for the first device with the user account, wherein the association allows the user to use the service with the first device;

communicating, by the second device, with the first device to activate the first device to use the service in response to receiving the user identifier and the unique identifier; and allowing, by the second device, access to the service from an application running on the first device in response to associating the unique identifier with the user account and activating the first device.

12. The non-transitory computer-readable storage medium of claim 11, wherein communicating with the first device to active the first device comprises:

communicating, by the second device, user credentials to the first device to activate the first device to use the service.

13. The non-transitory computer-readable storage medium of claim 11, wherein:

the representation comprises an encoded representation including the unique identifier, and the third device captured the encoded representation and decoded the encoded representation to determine the unique identifier.

14. The non-transitory computer-readable storage medium of claim 11, wherein the unique identifier is uniquely identified by a company that manufactured the first device.

15. A method for activating a first device for delivering media to the first device, the method comprising:

upon being provided on a first device, determining, by an application, that activation of the first device via a second device is necessary for configuring a service for a user to use on the first device;

determining a unique ID for the first device from the application, the unique ID originating from the first device;

outputting a representation of the unique ID via the first device, wherein:

the representation is configured to be captured by a third device in a same physical location and the third device can recognize the unique ID, the third device is configured to determine a user identifier for the user to allow the second device to activate the first device for the service, the user identifier originating from the third device, and the second device automatically receives the unique ID and the user identifier from the third device and activates the first device to use the service in response to receiving the user identifier and the unique identifier.

16. The method of claim 15, further comprising receiving user credentials from the second device to allow the application on the first device to log on to the service automatically.

17. The method of claim 15, wherein the representation comprises an encoded representation of the unique identifier.

18. The method of claim 15, further comprising:

receiving a request for a media program from the user on the first device for the service;

sending the request to the service for the media program; and receiving the media program from the service in response to sending the request.

19. The method of claim 15, wherein the unique identifier uniquely identifies the first device in a group of devices.

20. The method of claim 15, wherein the unique identifier is uniquely identified by a company that manufactured the first device.

* * * * *